(12) United States Patent
Velamala (10) Patent No.: US 11,909,818 B2
(45) Date of Patent: Feb. 20, 2024

(54) REACHING A QUORUM WITH A NUMBER OF MASTER NODES

(71) Applicant: Avaya Management L.P., Durham, NC (US)

(72) Inventor: Vivekananda Velamala, Brighton, CO (US)

(73) Assignee: Avaya Management L.P., Durham, NC (US)

(\*) Notice: Subject to any disclaimer, the term of this patent is extended or adjusted under 35 U.S.C. 154(b) by 0 days.

(21) Appl. No.: 17/531,333

(22) Filed: Nov. 19, 2021

(65) Prior Publication Data

US 2023/0164215 A1     May 25, 2023

(51) Int. Cl.
*H04L 67/104* (2022.01)
*H04L 41/0668* (2022.01)
*H04L 41/084* (2022.01)
*H04L 67/1074* (2022.01)

(52) U.S. Cl.
CPC ...... *H04L 67/1051* (2013.01); *H04L 41/0668* (2013.01); *H04L 41/0846* (2013.01); *H04L 67/1076* (2013.01)

(58) Field of Classification Search
CPC ............. H04L 67/1051; H04L 67/1076; H04L 41/0668; H04L 41/0846
USPC ........................................................ 709/226
See application file for complete search history.

(56) References Cited

U.S. PATENT DOCUMENTS

| | | | |
|---|---|---|---|
| 7,461,130 B1 \* | 12/2008 | AbdelAziz | H04L 67/104 |
| | | | 709/208 |
| 10,521,311 B1 \* | 12/2019 | Greenwood | G06F 11/1448 |
| 10,929,415 B1 | 2/2021 | Shcherbakov et al. | |
| 11,360,867 B1 \* | 6/2022 | Subramanian | G06F 11/2084 |
| 11,502,913 B1 \* | 11/2022 | Kamen | H04L 41/145 |
| 11,563,809 B2 \* | 1/2023 | Smith | H04L 67/1034 |
| 11,567,802 B2 \* | 1/2023 | Sciarrino | G06F 9/50 |
| 11,570,092 B2 \* | 1/2023 | Kancherla | H04L 45/46 |
| 2012/0207100 A1 \* | 8/2012 | Hakola | H04W 76/14 |
| | | | 370/328 |
| 2016/0330707 A1 \* | 11/2016 | Das | H04L 41/40 |
| 2017/0359243 A1 \* | 12/2017 | Deuri | H04L 43/08 |
| 2018/0191865 A1 \* | 7/2018 | De Gaetano | G06F 11/2048 |
| 2020/0235988 A1 \* | 7/2020 | Lin | G06F 16/27 |
| 2020/0396148 A1 | 12/2020 | Shibler et al. | |
| 2021/0064442 A1 | 3/2021 | Alluboyinna et al. | |
| 2021/0216370 A1 \* | 7/2021 | Sciarrino | G06F 9/48 |
| 2022/0083375 A1 \* | 3/2022 | Zeng | G06F 9/5038 |

(Continued)

*Primary Examiner* — Tauqir Hussain
(74) *Attorney, Agent, or Firm* — Sheridan Ross P.C.

(57) ABSTRACT

Managing containerized workloads, such as by Kubernetes, provides a robust and expandable platform. Kubernetes high-availability (HA) mode provides additional safeguards against failure that allows services to be maintained without interruption in the event of a partial system or network failure. However, Kubernetes requires an odd number of master nodes (e.g., three) in order to be able have a quorum and maintain certain operations (e.g., election of a leader). In the event a master node loses functionality, the remaining master nodes are unable to have a quorum. System and methods are provided to convert a worker-only node into a master node in order to reestablish a quorum. Once functionality is restored, the converted master is reverted back to a worker-only node and the restored master, and remaining masters, maintain the quorum.

20 Claims, 6 Drawing Sheets

(56) References Cited

U.S. PATENT DOCUMENTS

| | | | |
|---|---|---|---|
| 2022/0091940 A1* | 3/2022 | Kumar | G06F 16/27 |
| 2022/0318104 A1* | 10/2022 | Bhargava | G06F 11/0772 |
| 2022/0337417 A1* | 10/2022 | Sanders | H04L 9/0894 |
| 2022/0383728 A1* | 12/2022 | Brown | G06V 20/17 |

* cited by examiner

REACHING A QUORUM WITH A NUMBER OF MASTER NODES

FIELD OF THE DISCLOSURE

The invention relates generally to systems and methods for management of distributed computing components and particularly to maintaining operations thereof in the event of a failure.

BACKGROUND

Kubernetes is a portable, extensible, open-source platform for managing containerized workloads and services, that facilitates both declarative configuration and automation. The Kubernetes documents, including specifications, may be found at www.kubernetes.io and are incorporated herein by reference for all they teach.

Software container orchestration, such as by implementing Kubernetes (often shortened to "K8s"), frequently launches and relocates application containers across nodes. A node can reside on physical or virtual hosts. Often block storage volumes that are mounted inside a particular container need to be mounted on a different node or need to be relocated to newly launched container. Kubernetes provides persistent volume (PV) mechanism to abstract how storage is made available and consumed by Pods and in turn by the Pods' containers.

While Kubernetes provides a robust platform, limitations remain that may adversely impact the operations if a portion of the platform becomes inoperable or unreachable.

SUMMARY

Embodiments herein address shortcomings and extend the functionality of Kubernetes. Kubernetes is defined by a standard, which is incorporated herein by reference in its entirety as described by the Kubernetes documentation (www.kubernetes.io/docs/home/) as of the time of filing of this application. Applying some or all embodiments described herein to extend other orchestration platforms which operate in a manner similar to Kubernetes, such as having a similar need for a number of master nodes to obtain a quorum, are also contemplated.

For a Kubernetes based cluster in high-availability (HA) mode, at least three masters are required. A master nodes has as set of services that function as the control plane of the cluster and manages worker nodes and their workloads within the cluster.

For certain installations, clusters are configured to span two clusters, such as zones or buildings, within a geographic area, such as a city. In order to create such a cluster that spans two buildings, it must be ensured that: a) when services at both buildings are available, at least three masters are operational; and b) if either building goes down or becomes isolated from the network, each building must maintain at least two masters.

Accordingly, there is a need to reach a quorum for two buildings to operate a single cluster control plane as opposed to three masters.

These and other needs are addressed by the various embodiments and configurations of the present invention. The present invention can provide a number of advantages depending on the particular configuration. These and other advantages will be apparent from the disclosure of the invention(s) contained herein.

As a general introduction to the embodiments herein, and in one embodiment, systems and methods are provided to force a consensus between two installations in separate buildings to decide who will be the master. It should be appreciated that installations in two buildings is one embodiment and, in other embodiments, other zones may be utilized (e.g., floors, rooms, or other portions of a building; groupings of two or more buildings or portions thereof, etc.). Similarly, while the zones (e.g., buildings) may be within the same city in one embodiment, in other embodiments, the buildings may be closer (e.g., same campus, same block, etc.) or more dispersed (e.g., different cities, states, provinces, region, country, continent, etc.). Generally, when operating normally, the masters at the different zones operate together but may be separated, such as via an interruption to power or networking that affects the operation of one zone (e.g., power outage) or the network connection between zones, but allows at least one zone to remain operational. Algorithm or other logic is provided in order to make an application's components/instances reach a quorum and decide who will be the master, such as in a failure scenario when the application would otherwise fail to reach a quorum.

A Kubernetes cluster, with three or more nodes, has three nodes configured as master+worker nodes (or more simply the "master" node) and the remaining nodes, if any, configured as worker nodes only. On such a cluster when the master node(s) fail, at least two master nodes are needed to operate the control plane. If two master nodes go down, the remaining master node cannot form a quorum and therefore cannot operate the control plane. The formula used to reach the required quorum is n/2+1, where n is the number of configured master nodes. Therefore, for a three master nodes Kubernetes cluster, at least two master nodes have to be available to function as the system requires >50% of the masters to reach quorum.

Because of the quorum requirement, the Kubernetes architecture support three zones but not two, with each zone having a master node. If one zone goes down, the master nodes in the remaining two zones will detect that a master node is down and engage in a leader election in order to form a quorum with the remaining zones and continue to operate the cluster's control plane.

Accordingly, when both zones in a two-building implementation are operational, three masters are provided between the two buildings. If either of the buildings go down or become isolated from the network, either surviving building will have at least two masters. To maintain a quorum and continue the cluster's control plane, a detection means is provided to detect that an isolation event has occurred and, if so, check the number of master nodes running on the surviving building. If a quorum cannot be reached with the existing nodes, a current worker node or nodes is then converted into a master node(s) to reestablish three masters for the building. This ensures sufficient masters are present to reach a quorum. Having three masters in the isolated building allows for a subsequent node failure without affecting the cluster. The installation is provided with sufficient worker nodes for each building to ensure each building has enough nodes available to be converted into master nodes and re-establish the quorum.

When the failed or isolated building comes back online, the excess master node(s) are converted back to worker-only nodes. This may occur one node at a time.

As a benefit, the embodiments herein do not depend on the cluster control plane to convert a worker node into a master node or be running on the cluster nodes in both buildings.

It should be appreciated that other Kubernetes implementations may have other cluster topologies, without regard to zones, buildings, or cities, but which have three masters in a zone, may benefit from the embodiments provided herein when the implementation would allow at least one master to become unavailable and, as a result, cause a remaining node(s) to be unable to have a quorum. For example, all nodes may be physically co-located, but provided with two or more power source or network subnet in order to maintain operations should one power supply or network component fail.

The embodiments herein further allow a simpler solution to maintaining a quorum in the event of a failure. Creating a fourth master would require three nodes for a quorum (as per the formula n/2+1) and further complicates the installation. Similarly, even more nodes complicate the installation even further.

As used herein, and in one embodiment, the term "master" node refers to a Kubernetes master+worker node.

As used herein, and in one embodiment, the term "worker" node refers to a Kubernetes worker-only node that does not have or operate as a master node.

As used herein, the term "node," when not otherwise designated as a worker node or master node, refers to shared attributes common to both worker nodes and master nodes.

In one embodiment, a method is disclosed, comprising: determining, by a processor executing instructions from a non-transitory memory to exchange data in a network interconnecting components of a system, a loss of functionality of a first master node, wherein the components comprise master nodes and worker nodes, wherein the master nodes comprise the first master node and a second master node, and wherein each of the master nodes are operable to execute an application from application instructions; determining that the master nodes and the worker nodes execute the application in a first cluster and a second cluster; and based on the determining the loss of functionality of the first master node, converting one of the worker nodes to a new master node by copying state information to the one of the worker nodes.

In another embodiment, a system is disclosed, comprising: a network interconnecting components of the system for exchange of data thereon; at least one server with a processor and instructions for the processor in a non-transitory memory; master nodes comprising a first master node and a second master node, wherein each of the master nodes are operable to execute an application from application instructions; worker nodes; a first cluster comprising the first master node; a second cluster comprising the second master node and one of the worker nodes; wherein the first master node loses functionality, and wherein the one of the worker nodes is converted to a new master node.

In another embodiment, a non-transitory computer-readable medium is disclosed comprising a set of instructions stored therein which, when executed by a processor, causes the processor to manage a worker node by: determining, by a processor executing instructions from a non-transitory memory to exchange data in a network interconnecting components of a system, a loss of functionality of a first master node, wherein the components comprise master nodes and worker nodes, wherein the worker nodes comprise the worker node, wherein the master nodes comprise the first master node and a second master node, and wherein each of the master nodes are operable to execute an application from application instructions; and based on the determining the loss of functionality of the first master node, converting the worker node to a new master node, wherein the second master node and the new master node comprise a quorum.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference to one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
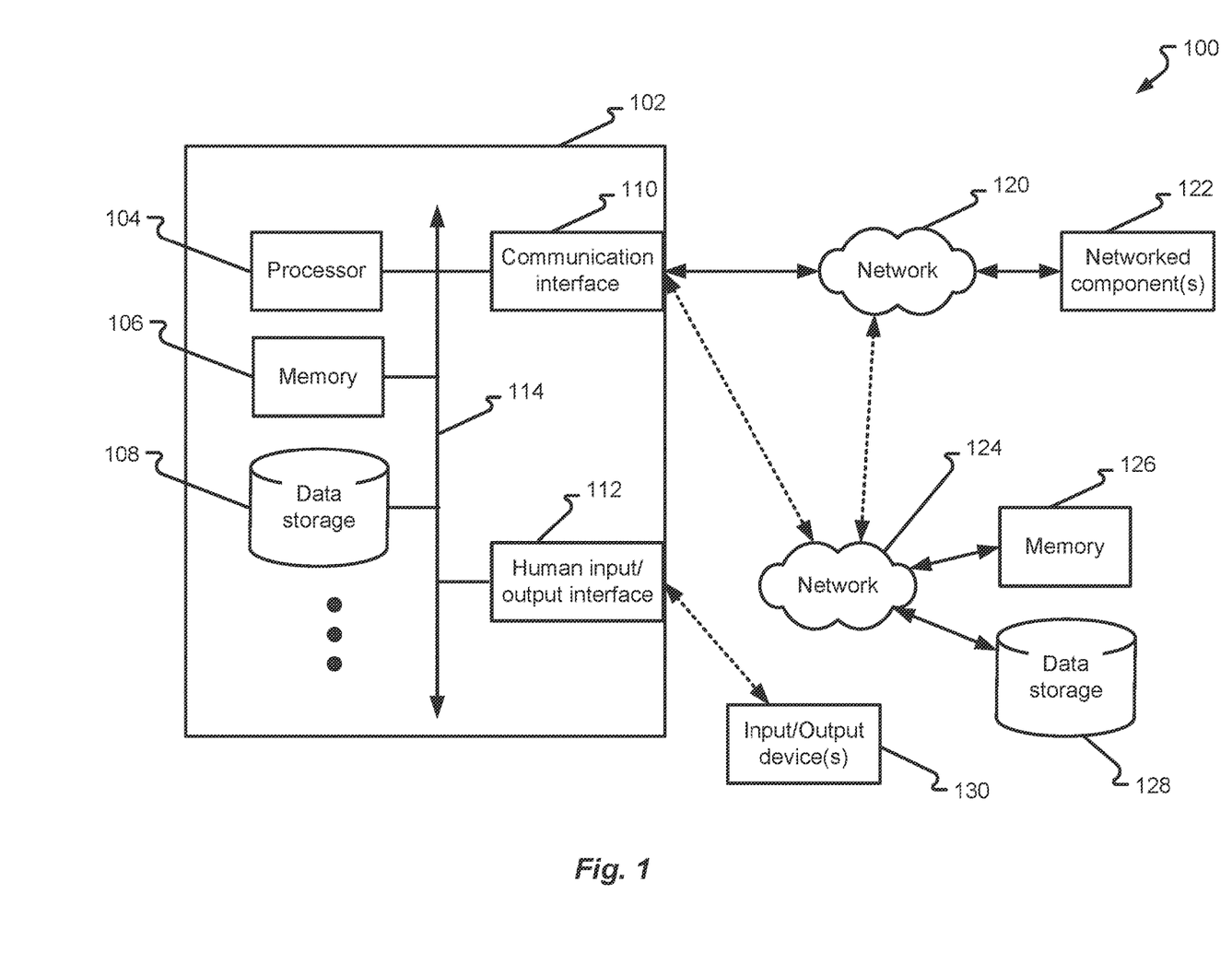
FIG. 1 depicts a first system in accordance with embodiments of the present disclosure.

FIG. 1 depicts server 102 in system 100 in accordance with embodiments of the present disclosure. In one embodiment, server 102 may comprising various components and connections to other components and/or systems. The components are variously embodied and may comprise processor 104. The term "processor," as used herein, refers exclusively to electronic hardware components comprising electrical circuitry with connections (e.g., pin-outs) to convey encoded electrical signals to and from the electrical circuitry. Processor 104 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 114, executes instructions, and outputs data, again such as via bus 114. In other embodiments, processor 104 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 104 is a non-transitory computing device (e.g., electronic machine comprising circuitry and connections to communicate with other components and devices). Processor 104 may operate a virtual processor, such as to process machine instructions not native to the processor (e.g., translate the VAX operating system and VAX machine instruction code set into Intel® 9xx chipset code to enable VAX-specific applications to execute on a virtual VAX processor), however, as those of ordinary skill understand, such virtual processors are applications executed by hardware, more specifically, the underlying electrical circuitry and other hardware of the processor (e.g., processor 104). Processor 104 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 104, server 102 may utilize memory 106 and/or data storage 108 for the storage of accessible data, such as instructions, values, etc. Communication interface 110 facilitates communication with components, such as processor 104 via bus 114 with components not accessible via bus 114. Communication interface 110 may be embodied as a network port, card, cable, or other configured hardware device. Additionally or alternatively, human input/output interface 112 connects to one or more interface components to receive and/or present information (e.g., instructions, data, values, etc.) to and/or from a human and/or electronic device. Examples of input/output devices 130 that may be connected to input/output interface include, but are not limited to, keyboard, mouse, trackball, printers, displays, sensor, switch, relay, speaker, microphone, still and/or video camera, etc. In another embodiment, communication interface 110 may comprise, or be comprised by, human input/output interface 112. Communication interface 110 may be configured to communicate directly with a networked component or utilize one or more networks, such as network 120 and/or network 124.

Network 120 may be a wired network (e.g., Ethernet), wireless (e.g., WiFi, Bluetooth, cellular, etc.) network, or combination thereof and enable server 102 to communicate with networked component(s) 122. In other embodiments, network 120 may be embodied, in whole or in part, as a telephony network (e.g., public switched telephone network (PSTN), private branch exchange (PBX), cellular telephony network, etc.)

Additionally or alternatively, one or more other networks may be utilized. For example, network 124 may represent a second network, which may facilitate communication with components utilized by server 102. For example, network 124 may be an internal network to a business entity or other organization, whereby components are trusted (or at least more so) that networked components 122, which may be connected to network 120 comprising a public network (e.g., Internet) that may not be as trusted.

Components attached to network 124 may include memory 126, data storage 128, input/output device(s) 130, and/or other components that may be accessible to processor 104. For example, memory 126 and/or data storage 128 may supplement or supplant memory 106 and/or data storage 108 entirely or for a particular task or purpose. For example, memory 126 and/or data storage 128 may be an external data repository (e.g., server farm, array, "cloud," etc.) and enable server 102, and/or other devices, to access data thereon. Similarly, input/output device(s) 130 may be accessed by processor 104 via human input/output interface 112 and/or via communication interface 110 either directly, via network 124, via network 120 alone (not shown), or via networks 124 and 120. Each of memory 106, data storage 108, memory 126, data storage 128 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 130 may be a router, switch, port, or other communication component such that a particular output of processor 104 enables (or disables) input/output device 130, which may be associated with network 120 and/or network 124, to allow (or disallow) communications between two or more nodes on network 120 and/or network 124. One of ordinary skill in the art will appreciate that other communication equipment may be utilized, in addition or as an alternative, to those described herein without departing from the scope of the embodiments.

Figure 2:
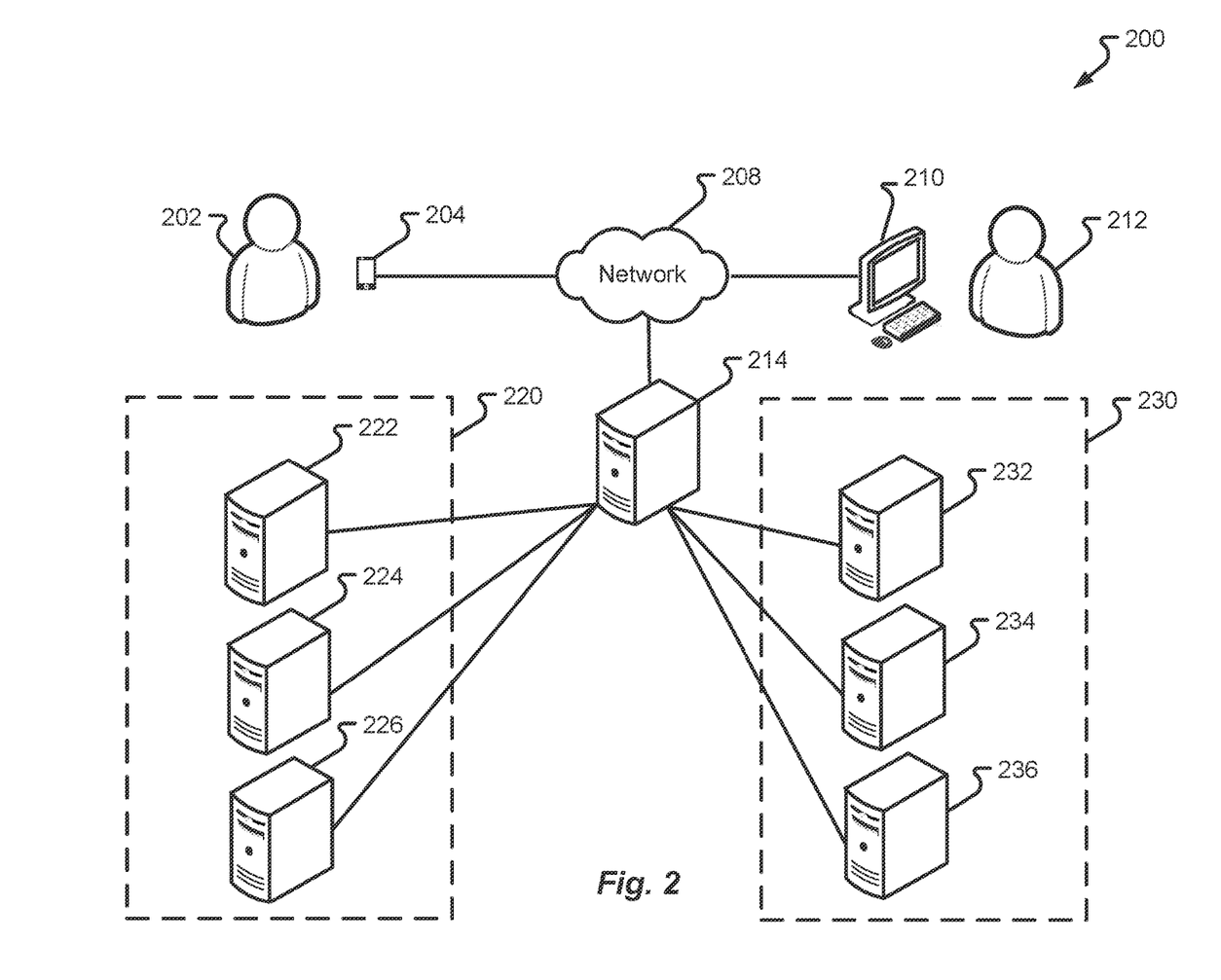
FIG. 2 depicts a second system in accordance with embodiments of the present disclosure.

FIG. 2 depicts system 200 in accordance with embodiments of the present disclosure. In one embodiment, user 202 operates user device 204 which in turn communicates with API server 214 via network 208, such as to perform a task on at least one server. Administrator 212 utilizing administrator device 210 may configure system 200, via network 208 issuing configuration commands to API server 214. Once configured, user device 204 may receive services from one or more servers.

Kubernetes is deployed in a hub-and-spokes pattern, such as API server 214 being the hub and operating a control plane. The "spokes" being servers 222, 224, 226, 232, 234, 236, which may further be grouped into a number of zones, such as building 220 and building 230. In another embodiment one or more of servers 214, 222, 224, 226, 232, 234, 236, user device 204, administrator device 210 is embodied as device 102. In another embodiment, network 208 is embodied as network 120 or, in another embodiment, embodied as network 124. It should be appreciated that work nodes and/or master nodes may be instantiated and execute on a server (e.g., physical machines). In another embodiment, virtual machines are used in place of some or all physical machines hosting the nodes, wherein the virtual machines are, in turn, executed on one or more physical machines as is known in the art of virtual machines (VM).

In another embodiment, each server 222, 224, 226, 232, 234, 236 operates as a worker node and three servers of servers 222, 224, 226, 232, 234, 236 additionally operates as a master node, wherein two master nodes are in one of zone 220 or building 230 and one master node is in the other of building 220 or building 230.

In the event one or two, but not all three master nodes lose functionally, such as due to a power failure, network failure, etc., the building with one or two remaining operational master nodes are unable to obtain a quorum. To reestablish a quorum with only one of building 220 or building 230 remaining, one or two of the worker-only servers is converted to a master server. For example, if building 230 suffers a failure or otherwise causes API server 214 to be unable to communicate or receive services from, the one (or two) master nodes operating on one or more of servers 232, 234, 236, then building 220 will have two (or one) master nodes and not have a quorum. Accordingly, two (or one) of the servers 232, 234, 236 that is presently a worker-only node, is converted to a master+worker node. As a result, building 220 will then have the required three master nodes and, therefore, a quorum.

In another embodiment, a node is converted from worker-only to master+worker via copying state information to a target worker-only node. The state information may originate from one or more locations, such as a copy of state information for a master node may be held by API server 214 or other memory/storage device (e.g., database), another master node, or one or more worker-only nodes. As a result, when a master node becomes non-functional, the state information may be copied to the target worker-only node from an external source, or reconfigured to utilize master node state information in place of its own worker-only state information. Additionally or alternatively, state information may be duplicated from a still-functional master node, if available.

In another embodiment, such as when a non-functional master node becomes functional again, the state information from the converted node is copied to the now functional master node. The converted master node may reload its own prior worker-only state or obtain worker-only state information from another source, such as another worker node, master node, control plane, etc. As a result, the state of all the nodes is returned to the operational state as they existed prior to the master node(s) becoming non-functional.

Figure 3:
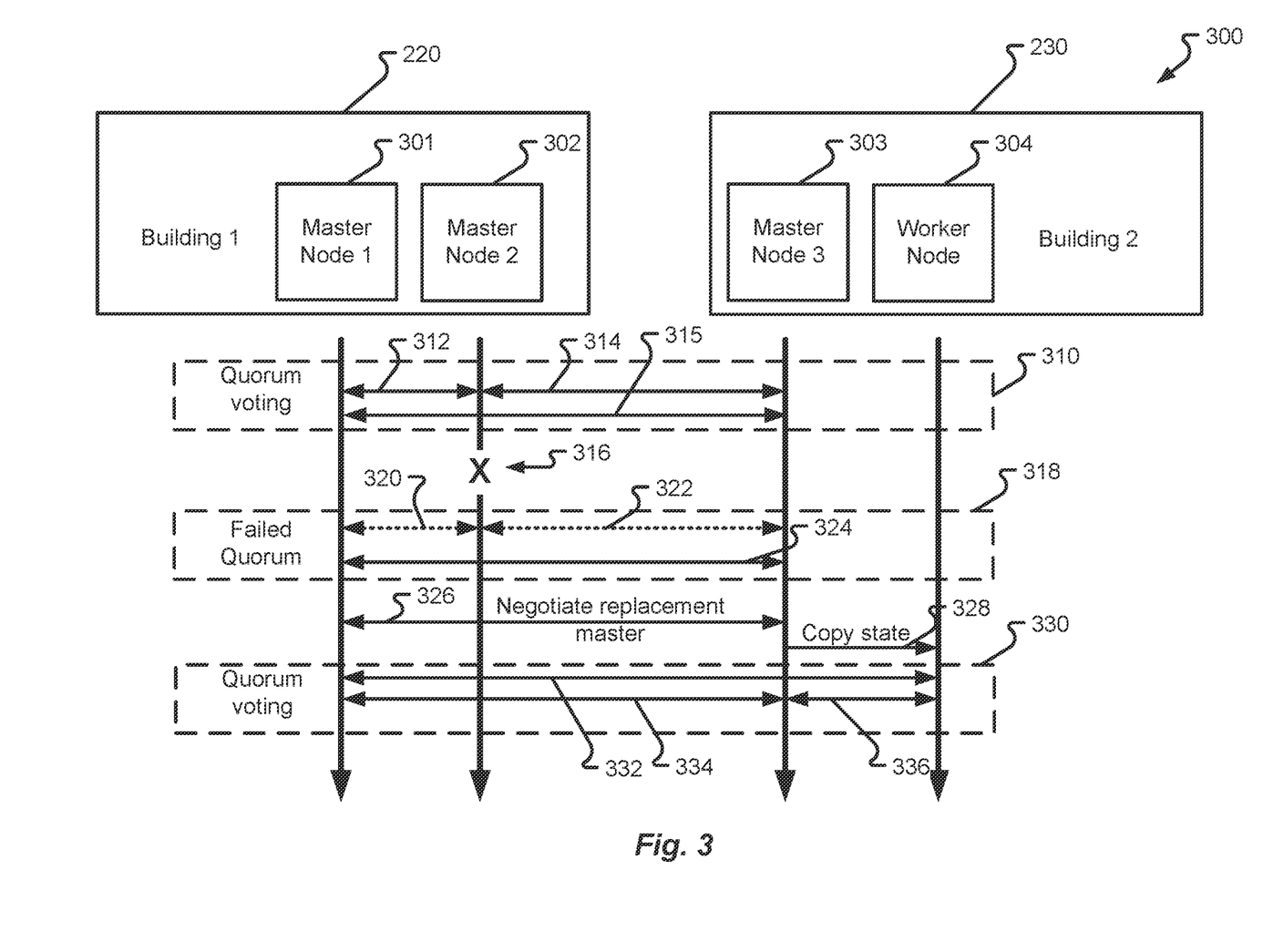
FIG. 3 depicts an interaction in accordance with embodiments of the present disclosure.

FIG. 3 depicts interaction 300 in accordance with embodiments of the present disclosure. In one embodiment, the operations described in interaction 300 are embodied, at least in part, by machine readable instructions maintain in a non-transitory memory that, when read by at least one processor, cause at the least one processor to perform portions of the operations. Communications between components may be performed by configured hardware (e.g., network interface(s)) communicating over a network, such as network 208 and/or other network or data conduit.

In one embodiment, building 220 comprises two master nodes, master node 301 and master node 302. Building 230 comprises master node 303 and worker node 304. It should be appreciated that none, one, or both building 220 or building 230 may comprise additional work nodes but, for the embodiment illustrated in interaction 300, do not comprise more than three master nodes, which are interconnected such as to vote, at any one time. As will be described below, additional master nodes are provided such as when building 220 and building 230 become isolated from each other on the network.

In one embodiment, (e.g., "sunny day") all nodes and connections are operational. Quorum voting 310 occurs as necessary as required by the particular deployment of Kubernetes, such as in a HA mode (active-active or active-passive). Voting may be required by master nodes 301, 302, 303. Voting may be required, such as to elect a leader (one of master nodes 301, 302, 303) to allow certain operations, (e.g., remove or restart particular Kubernetes pods). Accordingly, voting 312, 314, 315 may periodically determine the health of each master node, once of which is the leader.

In another embodiment, a failure event 316 has occurred and master node 302 is no longer functional. The failure may be due to a networking issue, power supply issue, hardware failure or other failure or combinations of failures. Failed quorum 318 now comprises communication 324, between master node 301 and master node 303, but failed communications 320 and 322 with master node 302. Master node 301 and master node 303 initiate master replacement negotiation 326. Master replacement negotiation 326 may determine the availability of worker nodes that may be converted to a new master. Master replacement negotiation 326 may be straightforward (e.g., the first of master node 301 or 303 that identifies an available worker node) or more elaborate, such as determining a worker node within one building 220 or 230 that is available, has lower utilization, etc. In another embodiment, the selection of a worker node is performed such that, once converted to a master, each of building 220 and 230 has at least one master node.

In the embodiment illustrated, copy 328 copies state information to work node 304 from master node 303. It should be appreciated that state information may be maintained in other locations. For example, worker node 304 may have or have access to state information of master node 303, master node 301, or failed node 302 and obtain the state information therefrom. As a result worker node 304 is converted to a master node. Thereby allowing intercommunications 332, 334, 336 and quorum 330 to be maintained.

In another embodiment, a network failure has occurred such as to isolate building 220 from building 230. If the failure affects access to the Internet or other network serving clients, then the isolated building is entirely non-operational. If two master nodes remain operational (e.g., building 230 has a failure), then work node 304 converted to a master node will be a worker node within building 220 (not shown). If one master node remains operational (e.g., building 220 has a failure), then worker node 304 and another node of building 230 (not shown) are converted to master nodes.

Figure 4:
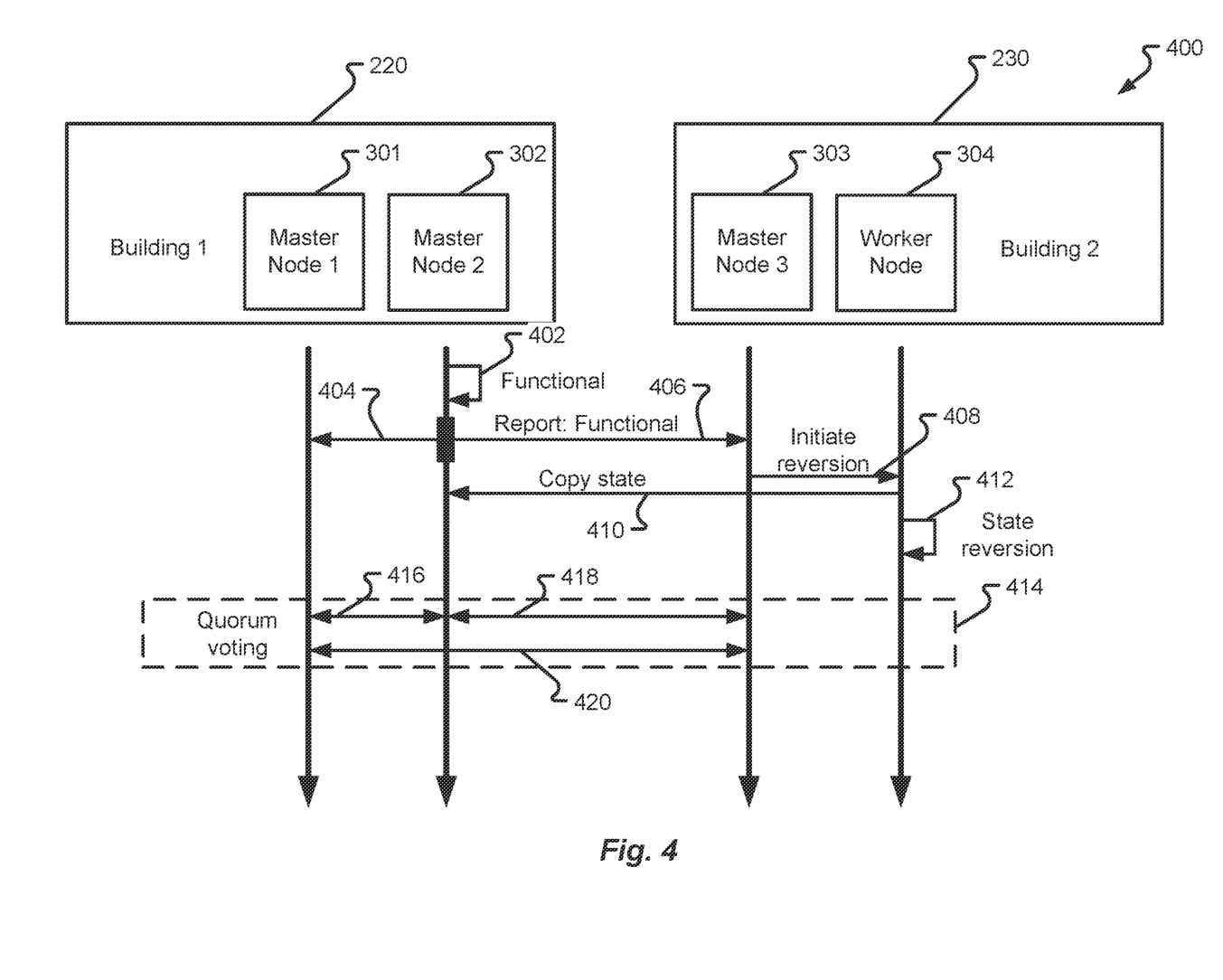
FIG. 4 depicts a first process in accordance with embodiments of the present disclosure.

FIG. 4 depicts process 400 in accordance with embodiments of the present disclosure. In one embodiment, the operations described in interaction 400 are embodied, at least in part, by machine readable instructions maintain in a non-transitory memory that, when read by at least one processor, cause at the least one processor to perform portions of the operations. Communications between components may be performed by configured hardware (e.g., network interface(s)) communicating over a network, such as network 208 and/or other network or data conduit.

A non-functional master node (e.g., master node 302 following failure 316; see FIG. 3) may become functional again. In one embodiment, such a node may be converted to a worker node and the currently existing master nodes continue. in another embodiment, the topography is restored to the pre-failure state. For example, currently failed master node 302 may be determined to be functional in step 402. As a result, node master node 302 reports functionality 404 and 406 to master nodes 301 and 303.

Master node 408 may initiate reversion 408, such as to signal or load worker-only state information into (currently master) worker node 304 and/or obtain state information therefrom. If state information is obtained, the state information may be loaded 410 to master node 302. It should be appreciated that, in other embodiments, state information may be maintained in master node 302, omitting copying state information, or obtained from other sources, such as master node 301, master node 303, and/or other source. State information is reverted in operation 412 thereby converting (currently master) worker node 304 back to a worker node. As a result, quorum voting 414 then comprises communications 416, 418, 420 between master node 301, 302, and 303 and omitting worker node 304.

Figure 5:
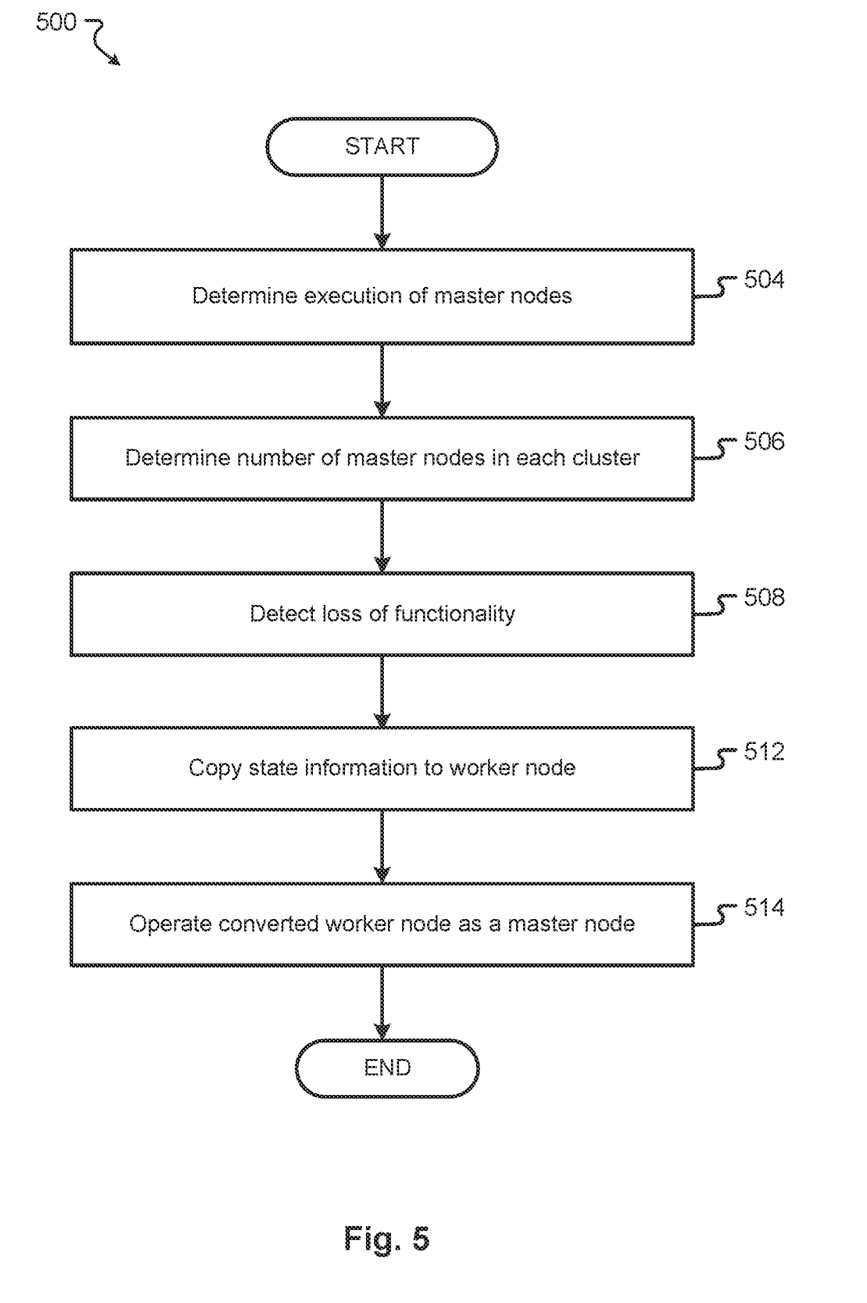
FIG. 5 depicts a second process in accordance with embodiments of the present disclosure.

FIG. 5 depicts process 500 in accordance with embodiments of the present disclosure. In one embodiment, the process 500 is embodied as machine-readable instructions maintain in a non-transitory memory that, when read by a processor, cause the processor portions of the steps of process 500. Process 500 beings and, at step 504, determines the execution of nodes to be executed as master nodes. Step 504 may be performed by issuing a "heartbeat" signal from each master node and/or in response to a polling signal to monitor nodes for their current state (master+worker or worker only) and/or operational status (e.g., normal, no response, etc.).

Step 506 determines the number of master nodes operational for each cluster. For example, each cluster will preferably have three masters and thereby maintain a quorum.

Step 508 is variously embodied and may determine if one or more master nodes (e.g., master nodes 301, 302, 303) are responsive or non-responsive. Step 508 may be proactive, such as by determining that one or more master nodes will be come non-functional, such as due to a planned power outage or other operation that can be foreseen. However, step 508 may determine that one or more master nodes is no longer functional by issuing a "heartbeat" signal and not receiving a reply. Additionally or alternatively, one or more master nodes may be indirectly determined to be non-functional. For example, if a network or power outage is determined or reported affecting building 220, then nodes 222, 224, 226 (see FIG. 2) will similarly be known to be non-functional and whichever nodes 222, 224, 226 that are master nodes are then determined to be non-functional. Accordingly, a "heartbeat" signal may be received periodically, or in response to a polling signal, as a means to monitor a power supply or network component or other component operational to report the functionality of a building and the components therein.

Step 512 copies state information to a worker-only node to convert the worker-only node into a master+worker node. Step 514 then operates the converted master+worker node as a master node to maintain the quorum.

Figure 6:
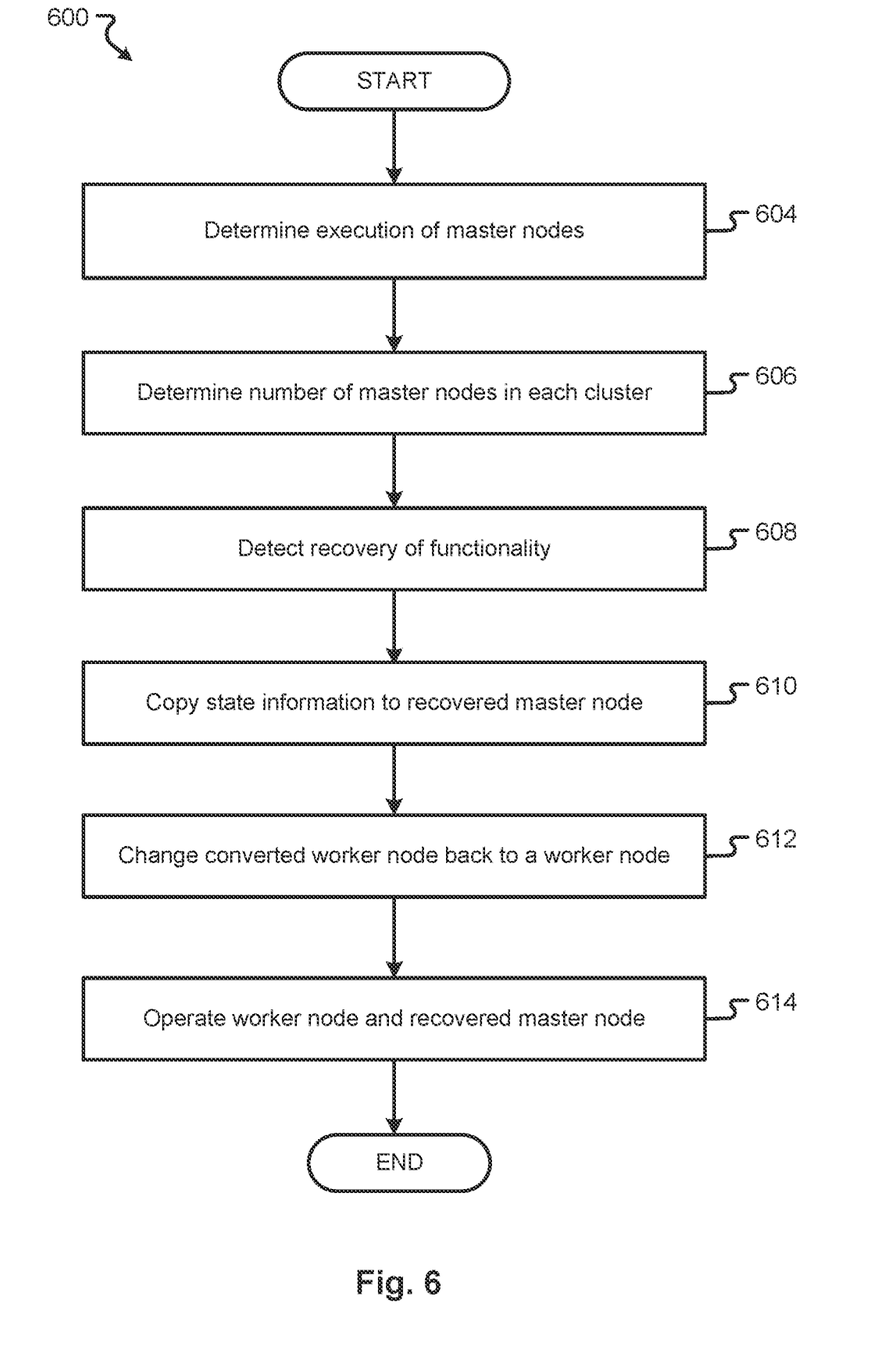
FIG. 6 depicts a third process in accordance with embodiments of the present disclosure.

FIG. 6 depicts process 600 in accordance with embodiments of the present disclosure. In one embodiment, the process 600 is embodied as machine-readable instructions maintain in a non-transitory memory that, when read by a processor, cause the processor portions of the steps of process 600. Process 500 beings and, at step 504, determines the execution of nodes to be executed as master nodes. Step 604 may be performed by issuing a "heartbeat" signal from each master node and/or in response to a polling signal to monitor nodes for their current state (master+worker or worker only) and/or operational status (e.g., normal, no response, etc.). Step 606 determines the number of master nodes for each cluster and step 608 determines that functionality, of a previously non-functional master node, has returned. As a result, four master nodes are presently functional or able to be functional.

Step 610 copies state information to the recovered master node and, in step 612, reverts the previously converted worker-to-master node back to a worker only node. Step 614 then operates the previously converted worker-to-master node as a worker only node and the recovered master as one of the master nodes.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
   determining, by a processor executing instructions from a non-transitory memory to exchange data in a network interconnecting components of a system, a loss of functionality of a first master node, wherein the first master node becomes unable to function as a master node;
   wherein the components comprise master nodes and worker nodes;
   wherein the master nodes comprise the first master node and a second master node; and
   wherein each of the master nodes and each of the worker nodes are operable to execute an application from application instructions;
   determining that the master nodes and the worker nodes execute the application in a first cluster and a second cluster; and
   based on the determining of the loss of functionality of the first master node, converting one of the worker nodes to a new master node by copying state information to the one of the worker nodes.

2. The method of claim 1, wherein the first master node is a member of the first cluster, wherein the one of the worker nodes is a member of the first cluster, wherein the second master node is a member of the second cluster, and wherein the state information is a member of the first cluster.

3. The method of claim 1, wherein the determining the loss of functionality comprises:
   periodically detecting an availability of a first building comprising the first cluster by the instructions executed by the processor on a component of a second building comprising the second cluster;
   determining that the first building is not available on the network;
   determining a number of master nodes within the second cluster; and
   performing the converting the one of the worker nodes based on the determining that the first building is not available and the determining the number of master nodes within the second cluster.

4. The method of claim 3, wherein the number of master nodes within the second cluster is one.

5. The method of claim 1, wherein the converting the one of the worker nodes to the new master node comprises:
copying a configuration of the second master node comprising the state information at a time of the loss of functionality to the new master node.

6. The method of claim 5, wherein the first master node is within the first cluster, wherein the second master node is within the second cluster, and wherein the configuration is saved in a database associated with the second cluster.

7. The method of claim 3, further comprising determining that the first building is available, and converting the new master node to be the one of the worker nodes based on the determining that the first building is available.

8. A system, comprising:
a network interconnecting components of the system for exchange of data thereon;
at least one server with a processor and instructions for the processor in a non-transitory memory;
master nodes comprising a first master node and a second master node, wherein each of the master nodes are operable to execute an application from application instructions;
worker nodes;
a first cluster comprising the first master node;
a second cluster comprising the second master node and one of the worker nodes;
wherein the first master node loses functionality and the first master node becomes unable to function as a master node; and
wherein the one of the worker nodes is converted to a new master node by copying state information to the one of the worker nodes.

9. The system of claim 8, wherein the second master node and the new master node comprise a quorum.

10. The system of claim 8, wherein the conversion of the one of the worker nodes is based on the loss of functionality of the first master node.

11. The system of claim 8, wherein the second master node comprises the state information that executes the application.

12. The system of claim 8, wherein the state information enables the execution of the application.

13. The system of claim 8, wherein the first cluster is located at a first building, wherein the second cluster is located at a second building, and wherein the first building and the second building are located in distinct geographical locations.

14. The system of claim 13, wherein the first building comprises a third master node, and wherein the loss of functionality of the first master node comprises a loss of functionality of the first master node and the third master node.

15. The system of claim 8, wherein the loss of functionality of the first master node comprises an inability to function as a master node.

16. The system of claim 8, wherein the first cluster and the second cluster exchange the data to operate the system in a High Availability mode.

17. The system of claim 16, wherein the High Availability mode functions to maintain an execution of the application to continuously provide a service from before the loss of functionality of the first master node to after the conversion of the new master node.

18. The system of claim 16, wherein the system operates in the High Availability mode from before the loss of functionality of the first master node to after the conversion of the new master node.

19. A non-transitory computer-readable medium comprising a set of instructions stored therein which, when executed by a processor, causes the processor to manage a worker node by:
determining, by a processor executing instructions from a non-transitory memory to exchange data in a network interconnecting components of a system, a loss of functionality of a first master node, wherein the first master node becomes unable to function as a master node;
wherein the components of the system comprise master nodes and worker nodes;
wherein the master nodes comprise the first master node and a second master node; and
wherein each of the master nodes are operable to execute an application from application instructions; and
based on the determining of the loss of functionality of the first master node, converting the worker node to a new master node, wherein the second master node and the new master node comprise a quorum.

20. The non-transitory computer-readable medium of claim 19, wherein the loss of functionality comprises an inability to function as a master node.

* * * * *